United States Patent [19]

Rechter

[11] 4,113,502

[45] * Sep. 12, 1978

[54] ALUMINOUS REFRACTORY COMPOSITION

[75] Inventor: Harold L. Rechter, Chicago, Ill.

[73] Assignee: Chicago Fire Brick Company, Chicago, Ill.

[*] Notice: The portion of the term of this patent subsequent to Jan. 3, 1995, has been disclaimed.

[21] Appl. No.: 770,117

[22] Filed: Feb. 18, 1977

[51] Int. Cl.$^2$ .............................................. C04B 7/00
[52] U.S. Cl. ....................................... 106/67; 106/65
[58] Field of Search ................................... 106/65, 67

[56] References Cited

U.S. PATENT DOCUMENTS

| | | | |
|---|---|---|---|
| 1,943,584 | 1/1934 | Cross | 106/67 |
| 3,303,034 | 2/1967 | Troell | 106/67 |
| 3,888,687 | 6/1975 | Manigault | 106/67 |
| 3,998,648 | 12/1976 | Thrower et al. | 106/67 |
| 4,056,398 | 11/1977 | Rechter et al. | 106/67 |

*Primary Examiner*—L. Dewayne Rutledge
*Assistant Examiner*—John P. Sheehan
*Attorney, Agent, or Firm*—Foster York

[57] ABSTRACT

Refractory compositions containing alumina or aluminum silicate and a phosphate bonding agent can be improved by the addition of from 0.2 to 1.5 percent tetrasodium pyrophosphate (TSPP) in combination with bentonite. The TSPP minimizes the amount of bentonite required for good workability in aqueous formulations for ramming or hand applications, thereby miximizing density and minimizing water required for tempering, also extending the storage life of these refractories and maintaining a high percentage of initial workability over a period of several months.

10 Claims, No Drawings

ALUMINOUS REFRACTORY COMPOSITION

This invention relates to improvements in alumina or aluminum silicate refractory compositions containing a phosphate bonding agent, and especially to the aqueous compositions containing ground particles of anhydrous (calcined, fused or like treated) alumina or aluminum silicates, and a substance in combination with bentonite to maintain workability and increase shelf life.

Liquid and plastic compositions containing aluminous materials, including bentonite, and a phosphate bonding agent are known in the art and have been used to form refractory linings for furnaces, ladles and the like, and for other purposes in the refractory art.

Troell U.S. Pat. No. 3,303,034 and Thrower et al. U.S. Pat. No. 3,998,648 show the use of bentonite with other aluminous material in a plastic refractory composition containing a phosphate bonding agent but do not disclose any material in combination with bentonite to improve the working characteristics and storage life of the composition.

Citric acid, oxalic acid and many other organic acids have been used to extend the storage life of aluminous refractory compositions that do not contain bentonite, but none of these compositions have as good working characteristics and stability as the composition of this invention.

The major difficulties in formulating phosphate bonded alumina or calcined aluminum silicate refractories are:
(1) they tend to lose workability over a period of weeks or months due to chemical reactions of the phosphate binder and components of the mix,
(2) they require a certain amount of clay-type plasticizers to maintain workability from the time of manufacture through the period of degrading workability until use and relatively high clay content tends to decrease density and refractoriness, and
(3) they need to be formulated with sufficient water to maintain working characteristics, sometimes resulting in a tendency to slump, form drying cracks, and/or require too much heating time for strength development.

Applicant has found that he can minimize and even omit the raw clay plastizer content of plastic refractory compositions, thereby minimizing water requirements, thereby decreasing drying time and shrinkage, while maintaining workability over a storage period of several months by incorporating in a mixture comprising alumina ($Al_2O_3$) or aluminum silicate, and a phosphate bonding agent, a minor amount of bentonite and a small amount of tetrasodium pyrophosphate (hereinafter designated as TSPP), said TSPP acting as an extender for the bentonite in terms of promotion of plastic properties and shelf life.

The types of refractory products applicable to the beneficial addition of TSPP range from low to high alumina or aluminum silicate contents, but are preferably 50-95 percent by weight.

The bentonite, which is preferably sodium bentonite, generally called Western or Wyoming bentonite, may be present in 4-8 percent for best results, although as low as 2 percent and as high as 20 percent may be present.

The TSPP content is effective at 0.2 percent and increases up to about 0.6 percent, above which there has been found to be little or no gain in effectiveness. A percentage of 0.4-0.6 percent is preferred.

The water content of the composition is sufficient to obtain a plastic or liquid composition and may vary depending upon the use, such as, for example, that required for ramming in place and that for vibratory forming, to that for hand or trowel application.

Preferably the refractory composition of this invention contains a large proportion, such as 40-60 percent, of relatively coarse refractory aggregate grains of anhydrous alumina or anhydrous aluminum silicate including, for example, calcined bauxite, tabular alumina, calcined clay, or calcined kyanite with a smaller proportion such as 15-40 percent of fine particles such as −60 mesh anhydrous alumina or anhydrous aluminum silicate.

Preferably the fine particles comprise −325 mesh calcined alumina in amount of at least 15 percent of the composition, suitably 15-40 percent.

The relatively coarse particles of aggregate grains may range from 5/16 or ¼ inch and down for ramming mixes to ⅛ inch or finer for hand applied refractories down to −28 mesh for mortars.

Kyanite additions can add firing expansion properties to the refractory. Pulverized brick in place of part of the calcined alumina is an economy measure for lower alumina systems. Hydrated alumina at about 1 percent does aid shelf life of phosphate bonded refractories and is preferred, although not necessary.

Bentonite, preferably −200 mesh is the only clay-type plasticizer which gives the combined properties of good workability in relatively low concentration, good tackiness and long shelf life in combination with TSPP. Ball clays and kaolin do not retain as useful workability over a period of months, but small additions of these to bentonite, such as about 1-2 percent, may be used without substantially decreasing the effectiveness of the bentonite-TSPP combination.

A suitable embodiment of this invention is shown in the following broad composition range from which preferred classes of formulation have been selected for the examples:

| | % |
|---|---|
| -5/16 inch or finer aggregate grains from the group tab alumina, calcined bauxite or calcined clay | 40-60 |
| -60 mesh calcined alumina or calcined aluminum silicate | 15-40 |
| Bentonite | 4-8 |
| Alumino-silicate additions, -35 mesh or finer, raw or calcined kyanites, pulverized bauxite, pulverized brick | 0-20 |
| -325 mesh hydrated alumina | 0-3 |
| 75% phosphoric acid | 5-12 |
| TSPP | 0.2-1.5 |

The $P_2O_5$ content obtained with use of 75 percent phosphoric acid can be also obtained with other concentrations as well as with water soluble phosphoric acid salts which form phosphoric acid in solutions including the use of various concentrations of monoaluminum dihydrogen phosphate solutions. The term "phosphate binder" means phosphoric acid or salts which form phosphate ions in aqueous solution.

The above proportions and materials are not to be regarded as critical for all purposes of this invention, since broadly the essence of the invention is any aluminous refractory composition which includes bentonite and TSPP.

The following examples are given to further illustrate the invention:

EXAMPLE I

A nominally 85 percent alumina (dry basis) refractory plastic was formulated as follows:

|  | Batch | |
|---|---|---|
|  | Lbs. | % |
| ⅜ by fines calcined So. Amer. bauxite | 1800 | 59.3 |
| -325 mesh calcined alumina | 800 | 26.4 |
| -200 mesh Western bentonite | 100 | 3.3 |
| 35 mesh raw kyanite | 100 | 3.3 |
| 75% phosphoric acid | 175 | 5.8 |
| -325 mesh hydrated alumina | 50 | 1.6 |
| TSPP | 12 | 0.4 |

This blend was mixed and tempered in a muller with sufficient water to produce a plastic just in excess of 40 percent workability based on ASTM Standard C181-47, about 8 percent moisture as measured by use of an infrared heat lamp. This plastic had good structure and stiffness, but would have been of a crumbly nature with less than 5 percent bentonite without the TSPP. Good workability is maintained for several months when wrapped and stored properly to prevent dry out.

EXAMPLE II

A nominally 55 percent alumina (dry basis) refractory plastic was blended in a laboratory muller mixer as follows:

|  | Lbs. |
|---|---|
| ¼ × ⅛ inch calcined bauxitic clay (47% Al₂O₃) | 12 |
| ⅛ inch by fines calcined bauxitic clay | 24 |
| -325 mesh calcined alumina | 12 |
| -35 mesh raw kyanite | 3 |
| -200 mesh Western bentonite | 4 |
| -325 mesh hydrated alumina | 1 |
| 75% phosphoric acid | 4 |
| TSPP | 4 oz. |

This material was tempered with water to attain a workability slightly in excess of 40 percent, based on ASTM C181-47, with a moisture of 8.6 percent as determined by drying with an infrared lamp using an Ohaus Moisture Determination Balance. This material maintained excellent workability over a period of months, and high installed density (158 lbs./cu. ft.) due to the relatively low levels of bentonite and moisture made practical with the TSPP addition.

EXAMPLE III

A soft hand or trowel applied lining refractory of 92 percent alumina content (dry basis) was prepared in a laboratory mix muller of the following:

|  | Lbs. |
|---|---|
| -14 mesh tabular alumina | 30 |
| -325 mesh calcined alumina | 21 |
| -35 mesh raw kyanite | 3 |
| -200 mesh Western bentonite | 2 lbs. 4 oz. |
| 75% phosphoric acid | 3 |
| -325 mesh hydrated alumina | 10 oz. |
| TSPP | 4 oz. |

About 3¾ lbs. water was added for tempering to a soft mix which could be scooped by hand for applying a lining. This is a very low water requirement, 8.3 percent moisture as determined by an Ohaus Moisture Determination Balance, for this type of product. The TSPP imparts a "sticky" quality to this type of formulation, thereby minimizing the requirement for bentonite, so that there is practically no drying shrinkage despite the apparent wetness. The consistency did not noticeably change over a period of a month, demonstrating the shelf life enhancement of TSPP to bentonite phosphate bonded plastics.

EXAMPLE IV

A nominally 90 percent (dry basis) refractory plastic was formulated as follows:

|  | Lbs. |
|---|---|
| -6 mesh tabular alumina | 36 |
| -35 mesh kyanite | 4 |
| -325 mesh calcined alumina | 10 |
| -200 mesh Western bentonite | 3 |
| -325 mesh hydrated alumina | 12 oz. |
| 75% phosphoric acid | 3 lbs. 8 oz. |
| TSPP | 3 oz. |

This blend was tempered with approximately 3 lbs. of water, having a moisture of 6.8 percent measured on the Ohaus Moisture Determination Balance. Workability was excellent for the relatively small percentage of bentonite used here, due to the presence of TSPP.

The following description and examples relate particularly to a soft plastic refractory which can be scooped out by hand for veneering or patching on metal or refractory surfaces, mainly components of metal melting equipment wuch as ladle, spouts, furnace walls, preheated air ducts and tuyeres.

Products of this general type have been available in high alumina formulations using tabular alumina and calcined bauxite aggregates, generally ranging from 75-90 percent alumina on a dry basis.

Applicant has developed a plastic alumina containing product, preferably a low alumina product of 50-65 percent alumina on a calcined basis, to take advantage of decreased thermal conductivity as well as lower cost. The necessary key to the successful formulation with minimum water requirement for extended working life is the use of a small addition of tetrasodium pyrophosphate (TSPP). Higher initial water contents will be required if TSPP is not used or with use of other known shelf life preservatives such as citric acid, causing reduced density and increased drying shrinkage.

The coarse aggregate component of our formulation should all be finer than ⅛ inch to impart the proper texture for hand application. Crushed calcined bauxitic or flint clays of 40 to 60 percent alumina contents are preferred, but a crushed fire brick can also be utilized. The fine matrix should mainly contain −325 mesh calcined alumina which will provide high resistance to molten iron or steel slag erosion to a refractory of this alumina content. Additions of −48 or −100 mesh raw kyanite is beneficial for achieving firing expansion to compensate for drying skrinkage. −35 mesh kyanite can also be used. Part of the calcined alumina can be replaced with pulverized fire brick, calcined clays, or calcined bauxite, but these tend to be detrimental to slag resistance and density. About 1 percent −325 mesh hydrated alumina is recommended as a shelf life aid, but is not required. Bentonite, preferably −200 mesh, is the only clay-type plasticizer which gives the combined properties of the required workability in relatively low concentration, good "tackiness" and long shelf life in combination with TSPP. Ball clays and kaolins do not retain the required workability over a period of months in our experience. Small additions of these to bentonite, such as about 1-2 percent, do not substantially affect the properties imparted by the bentonite.

The preferred composition range prior to water tempering for this invention is:

|  | % |
|---|---|
| -⅛ inch calcined clay or crushed fire brick of 40-60% alumina content | 40-60 |
| -325 mesh calcined alumina | 20-35 |
| Bentonite | 4-8 |
| Raw kyanite | 0-11 |
| -325 mesh hydrated alumina | 0-3 |
| Pulverized brick or calcined bauxite | 0-10 |
| 75% phosphoric acid | 5-8 |
| TSPP | 0.2-1.5 |

We prefer the use of 75 percent phosphoric acid but the same phosphoric oxide ($P_2O_5$) content can be obtained from other concentrations of the acid or by use of water suspensions of monoaluminum dihydrogen phosphate binder. The TSPP increases effectiveness up to the 1.5 percent range, and above this range there is little or no gain from the increase.

Tempering water is added so that the moisture as measured by exposure to an infrared heat lamp is in the range of 9.5 to 12 percent. Dryer than this is too stiff a mix for scooping by hand and wetter mixes will slump on vertical surfaces.

The following example illustrates the invention:

EXAMPLE V

| -⅛ inch calcined bauxitic kaolin (47% $Al_2O_3$) | 1000 lbs. |
|---|---|
| -70 mesh raw kyanite | 200 |
| -325 mesh calcined alumina | 500 |
| -200 mesh Western bentonite | 125 |
| -325 mesh hydrated alumina | 33 |
| 75% phosphoric acid | 135 |
| Citric acid | 3 |

The above mixture was blended in a ribbon mixer, tempered with water, and was quite soft freshly mixed for packing into pails or cartons. Water content as measured by an infrared heat lamp, such as Ohaus Moisture Determination Balance, was about 14 percent. The consistency was determined by use of a special Brookfield Viscosimeter Model HBT, with a five-fold increase in normal stiffness at the torsional element on the Heliopath stand (which lowers the spindle continuously while measuring). Using the "D" spindle at 5 RPM, readings on a 23-28 range were required for viscosity control. This formulation, with citric acid, necessarily contained more water content.

EXAMPLE VI

| -⅛ inch calcined bauxitic kaolin (47% $Al_2O_3$) | 1000 lbs. |
|---|---|
| -70 mesh raw kyanite | 200 |
| -325 mesh calcined alumina | 500 |
| -200 mesh Western bentonite | 125 |
| -325 mesh hydrated alumina | 33 |
| 75% phosphoric acid | 135 |
| TSPP | 8 |

This mixture was blended and tempered as in Example V and made to the same consistency range. The moisture content, however, averaged about 10.5 percent, substantially lower than when citric acid was used. The product could still be easily hand scooped for veneering 6 months after preparation.

The bentonite-tetrasodium pyrophosphate combination is also advantageous for use with aluminous refractory compositions containing carbon particles as is disclosed in applicant's application Aluminous Refractory Composition Containing Carbon, Ser. No. 770,116 now U.S. Pat. No. 4,066,467 filed of even date, herewith, and herein incorporated by reference.

In the specification and claims the term "calcined alumina" includes tap or tabulated alumina, and the term anhydrous alumina or anhydrous aluminum silicate includes calcined, fused or like anhydrous or dehydrated material.

The percentages given in the specification and claims are in percent by weight of the composition without water being present other than that in the 75 percent phosphoric acid. Essentially they are that of the dry solids.

All size grading or mesh indications are according to the standard Tyler series. Size in inches is the average diameter of the particles.

The term "alpha alumina" is a term covering both true calcined alumina and tabular alumina; tabular alumina being regarded only generally as a calcined alumina since, strictly speaking, it has been fired at higher than calcining temperature.

I claim:

1. In a refractory composition comprising an aluminous refractory material including bentonite and a phosphate bonding agent, the improvement of having tetrasodium pyrophosphate present in the composition in amount effective to improve storage life.

2. The composition of claim 1 wherein the aluminous material comprises alumina or aluminum silicate, and the phosphate bonding agent is phosphoric acid.

3. A refractory composition comprising anhydrous alumina or anhydrous aluminum silicate, a phosphate bonding agent in bonding amount, bentonite in minor amount and tetrasodium pyrophosphate in amount with the bentonite to maintain workability of the composition over a storage period of several months.

4. The composition of claim 3 wherein the alumina or aluminum silicate is present in 50-95 percent by weight, the phosphate bonding agent is present in amount to provide a $P_2O_5$ content in aqueous solution to equal that of 5-12 percent by weight of 75 percent by weight of phosphoric acid, bentonite is present in 4-8 percent by weight, and tetrasodium pyrophosphate is present in at least 0.2 percent by weight of the composition.

5. The composition of claim 4 wherein the phosphate bonding agent is phosphoric acid, the bentonite is sodium bentonite, the tetrasodium pyrophosphate is present in 0.2-1.5 percent by weight, and −60 mesh calcined alumina is present in 15-40 percent by weight.

6. The composition of claim 4 wherein the alumina or aluminum silicate is calcined.

7. A plastic composition in accordance with claim 3, having the following formulation in parts by weight:

|  | % |
|---|---|
| -5/16 inch or finer aggregate grains of tab alumina, calcined bauxite or calcined clay | 40-60 |
| -60 mesh anhydrous alumina or anhydrous aluminum silicate | 15-40 |
| Sodium bentonite | 4-8 |
| -35 mesh or finer raw or calcined kyanite, pulverized raw bauxite, pulverized brick | 0-20 |
| -325 hydrated alumina | 0-3 |
| 75% phosphoric acid | 5-12 |

-continued

| | % |
|---|---|
| Tetrasodium pyrophosphate | 0.2–1.5 |

8. The composition of claim 7 wherein hydrated alumina is present in up to 3 percent.

9. The composition of claim 7 wherein kyanite is present in up to 20 percent.

10. The composition of claim 7 wherein water is also present in amount to give a plastic composition.

* * * * *